(12) United States Patent
Wang et al.

(10) Patent No.: US 11,416,090 B2
(45) Date of Patent: Aug. 16, 2022

(54) TOUCH DEVICE AND MANUFACTURING METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Jin-Li Wang, Guangdong (CN); Yu-Min Hung, Guangdong (CN); Ying-Long Ye, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 16/541,134

(22) Filed: Aug. 14, 2019

(65) Prior Publication Data

US 2020/0379586 A1    Dec. 3, 2020

(30) Foreign Application Priority Data

May 28, 2019    (CN) .......................... 201910450935.2

(51) Int. Cl.
*G06F 3/041* (2006.01)
(52) U.S. Cl.
CPC .... *G06F 3/041* (2013.01); *G06F 2203/04103* (2013.01)
(58) Field of Classification Search
None
See application file for complete search history.

(56) References Cited

U.S. PATENT DOCUMENTS

| | | | | |
|---|---|---|---|---|
| 2014/0308435 | A1* | 10/2014 | Burberry | G06F 3/0443 427/79 |
| 2015/0177879 | A1* | 6/2015 | Misaki | G06F 3/0446 345/174 |
| 2015/0313008 | A1* | 10/2015 | Spath | G06F 3/047 345/174 |
| 2016/0132141 | A1* | 5/2016 | Chung | G06F 3/041 216/18 |
| 2017/0024040 | A1* | 1/2017 | Nakayama | G06F 3/0445 |
| 2017/0115818 | A1* | 4/2017 | Cai | G06F 3/04164 |
| 2019/0348476 | A1* | 11/2019 | Kato | H05B 33/06 |

FOREIGN PATENT DOCUMENTS

WO    WO-2018142739 A1 *   8/2018  ........... G06F 3/0446

* cited by examiner

*Primary Examiner* — Christopher R Lamb
(74) *Attorney, Agent, or Firm* — CKC & Partners Co., LLC

(57) ABSTRACT

The present disclosure provides a touch device and a manufacturing method thereof. The touch device includes a substrate, a touch electrode layer, a protective layer, and a plurality of wires. The substrate includes a first region and a second region, in which the second region is adjacent to the first region. The touch electrode layer is disposed in the first region and is completely covered by the protective layer. The protective layer has a plurality of openings. The openings expose a portion of the touch electrode layer and extend from the first region to the second region. Each wire is formed in the corresponding openings and extends from the portion of the touch electrode layer to the second region, in which each opening is partially filled with one of the wires, and thereby a recess is defined in each opening.

7 Claims, 24 Drawing Sheets

TOUCH DEVICE AND MANUFACTURING METHOD THEREOF

CROSS-REFERENCE TO RELATED APPLICATION

This application claims priority to China Application Serial Number 201910450935.2, filed May 28, 2019, which is herein incorporated by reference.

BACKGROUND

Field of Invention

The present disclosure relates to a touch device and a manufacturing method thereof.

Description of Related Art

At present, silver nanowires have been widely adopted as electrode material for touch devices. However, during the etching process of forming traces, silver nanowires are prone to be attacked by the etching liquid if the material of trace is copper and the trace is in direct contact with the silver nanowires. This is due to the low selectivity of the etching liquid to copper and silver nanowires. In addition, the etching liquid remained at the interface between copper and silver after the etching process can render the formation of copper-silver crystals, thereby causing short circuit issue of the traces. Furthermore, the interface adhesion between copper and silver nanowires is poor. Therefore, a new design is needed to solve the foregoing problems.

SUMMARY

One aspect of the present disclosure is to provide a touch device. The touch device comprises a substrate, a touch electrode layer, a protective layer, and a plurality of lead wires. The substrate comprises a first region and a second region. The second region is adjacent to the first region. The touch electrode layer is disposed in the first region. The touch electrode layer in the first region is covered by the protective layer. The protective layer has a plurality of openings exposing a portion of the touch electrode layer, and the openings extend from the first region to the second region. Each lead wire is formed in corresponding one of the openings and extends from the portion of the touch electrode layer to the second region. Each opening is partially filled with one of the lead wire, and thereby a recess is defined in each opening.

In one embodiment of the present disclosure, the touch electrode layer comprises silver nanowires, gold nanowires, copper nanowires, carbon nanotubes, or a combination thereof.

In one embodiment of the present disclosure, a thickness of the protective layer ranges from 1 μm to 15 μm.

In one embodiment of the present disclosure, a depth of each recess ranges from 1 μm to 15 μm, and the depth of each recess is less than the thickness of the protective layer.

In one embodiment of the present disclosure, the depth of each recess is less than the thickness of the protective layer.

In one embodiment of the present disclosure, the lead wires comprise gold, silver, copper, molybdenum, titanium, aluminium, nickel, or a combination thereof.

In one embodiment of the present disclosure, each of the lead wires is conformally formed in the openings.

In one embodiment of the present disclosure, the lead wires in the openings are in direct contact with the substrate.

Another aspect of the present disclosure is to provide a method of manufacturing touch device. The method comprises the steps of providing a substrate comprising a first region and a second region adjacent to the first region; forming a touch electrode layer in the first region; forming a protective layer covering the touch electrode layer, in which the protective layer has a plurality of openings exposing a portion of the touch electrode layer, and the openings extend from the first region to the second region; and forming a plurality of lead wires, in which each lead wire is formed in a corresponding one of the openings and extend from the portion of the touch electrode layer to the second region, each opening is partially filled with one of the lead wire, and thereby a recess is defined in each opening.

In one embodiment of the present disclosure, the step of forming the lead wires in the openings comprises conformally forming the lead wires in the openings.

BRIEF DESCRIPTION OF THE DRAWINGS

The disclosure can be more fully understood by reading the following detailed description of the embodiment, with reference made to the accompanying drawings as follows.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. The embodiments disclosed herein may be combined or substituted with each other in an advantageous manner, and other embodiments may be added to an embodiment without further description or description.

In the following description, numerous specific details are set forth in the following detailed description. However, embodiments of the present disclosure may be practiced without such specific details. In order to simplify the drawings, well-known structures and devices are only schematically shown in the figure.

Figure 1:
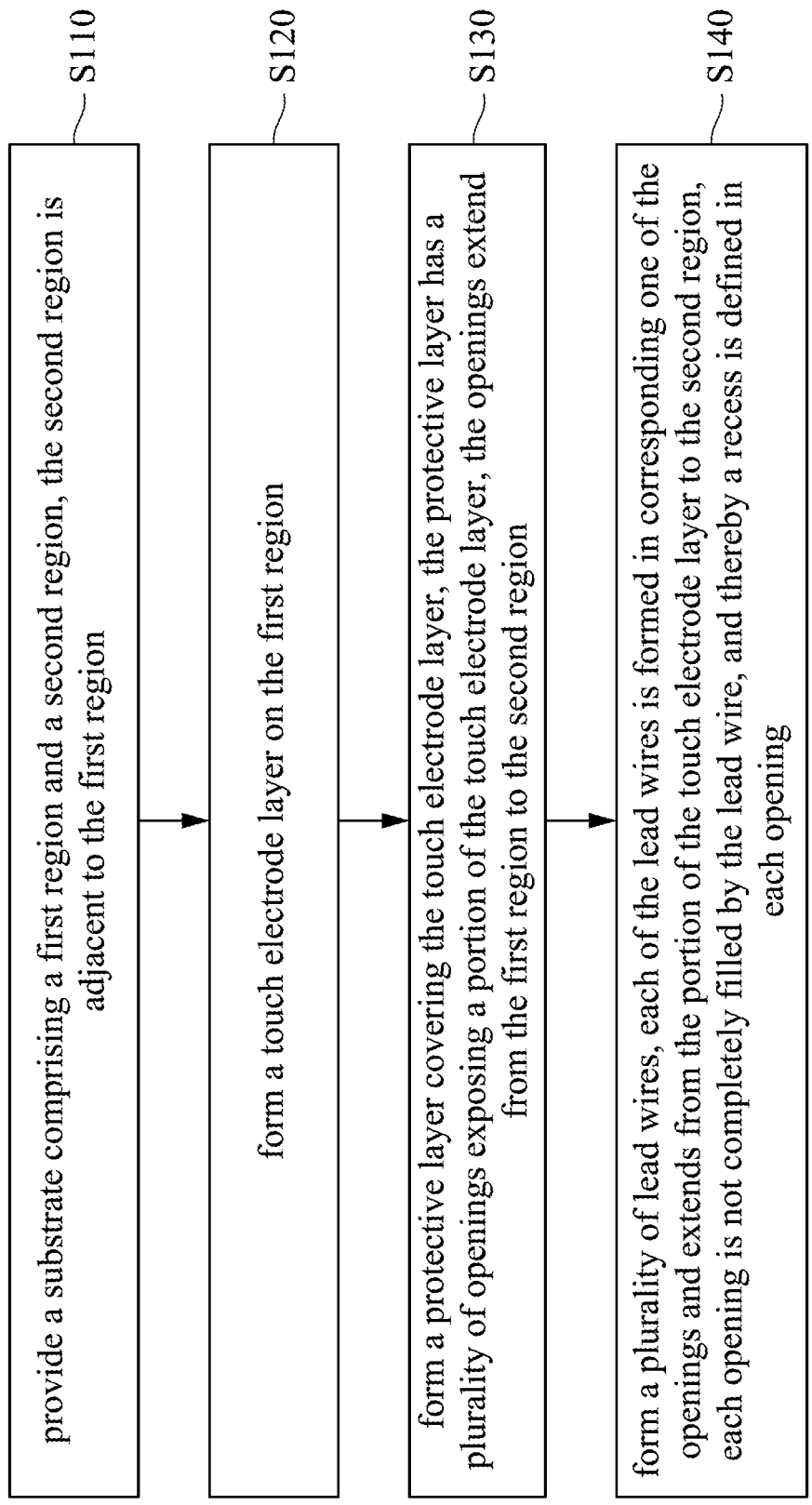
FIG. 1 illustrates a flow chart of a method of manufacturing touch device according to one embodiment of the present disclosure.

One aspect of the present disclosure is to provide a touch device and a manufacturing method thereof. The touch device can avoid short circuit problem of traces. FIG. 1 illustrates a flow chart of a method 100 of manufacturing a touch device according to one embodiment of the present disclosure. Referring to FIG. 1, method 100 includes step S110 to step S140. Step S110 includes providing a substrate 110.

Figure 2A:
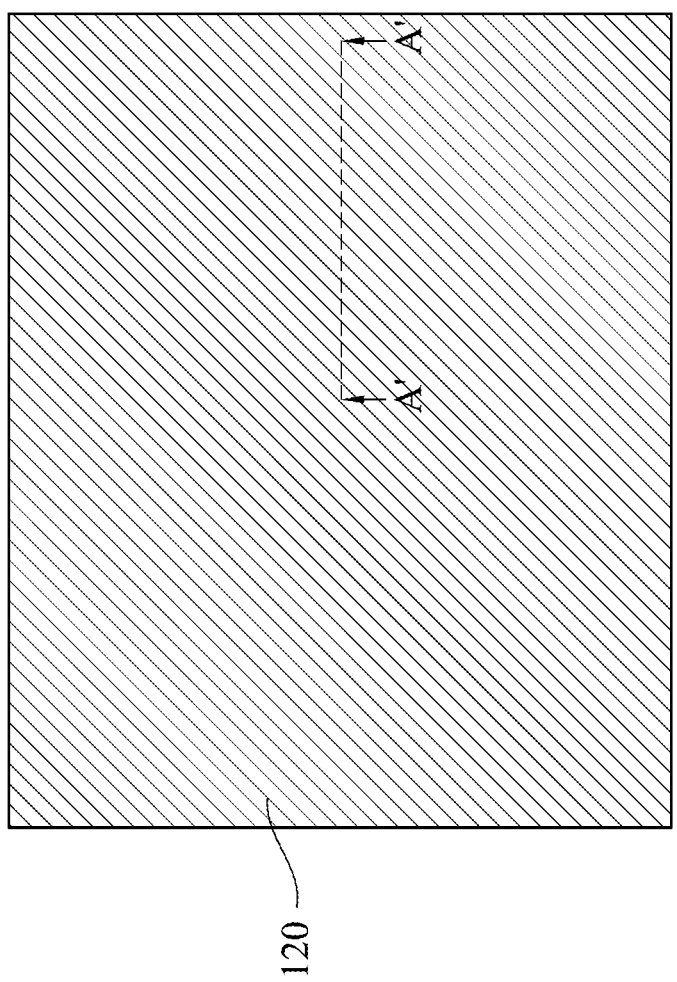
FIG. 2A, FIG. 3A, FIG. 4A, FIG. 5A, FIG. 6A, FIG. 7A, FIG. 8A, FIG. 9A, FIG. 10A, and FIG. 11A illustrate top views during various stages of a manufacturing method of touch device according to one embodiment of the present disclosure.
Figure 2B:
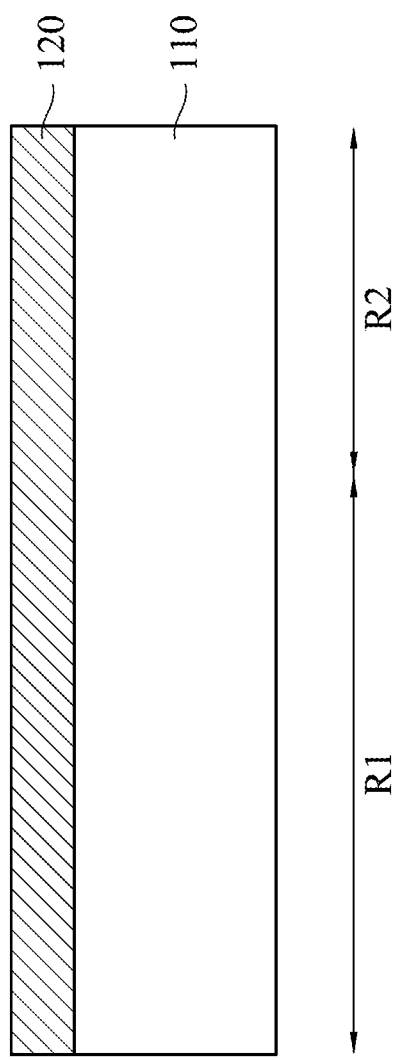
FIG. 2B, FIG. 3B, FIG. 4B, FIG. 5B, FIG. 6B, FIG. 7B, FIG. 8B, FIG. 9B, FIG. 10B, and FIG. 11B are respectively schematic sectional views along line A-A' in FIG. 2A to FIG. 11A.

Reference is made to FIG. 2A and FIG. 2B. FIG. 2A illustrates a top view during one stage of the method of manufacturing the touch device according to one embodiment of the present disclosure. FIG. 2B illustrates a schematic sectional view along line A-A' in FIG. 2A. As shown in FIG. 2B, the substrate 110 comprises a first region R1 and a second region R2. The second region R2 is adjacent to the first region R1. In one embodiment, the substrate 110 may be a rigid transparent substrate or a flexible transparent substrate, such as glass, polymethylmethacrylate (PMMA), polyvinyl chloride (PVC), polypropylene (PP), polyethylene terephthalate (PET), polyethylene naphthalate (PEN), polycarbonate (PC), polystyrene, (PS), and the like, but is not limited thereto.

Next, step S120 is performed to form a touch electrode layer in the first region. FIG. 2A, FIG. 3A, FIG. 4A, and FIG. 5A are top views during various process stages for implementing step S120. FIG. 2B, FIG. 3B, FIG. 4B, and FIG. 5B are respectively schematic cross-sectional view along line A-A' in FIG. 2A to FIG. 5A.

As shown in FIG. 2A and FIG. 2B, in one embodiment, an electrode material layer 120 is formed on the substrate 110. The formation technique of the electrode material layer 120 includes but not limited to forming a layer of dispersion liquid containing nanowires on the substrate 110 by a screen printing process, a spray coating process, or a roller coating process, and then drying the same to form the electrode material layer 120. In one example, the nanowires include silver nanowires, gold nanowires, copper nanowires, carbon nanotubes, or a combination thereof. The dispersion may include additives, surfactants or adhesives, such as carboxymethyl cellulose (CMC), hydroxyethyl cellulose (HEC), hydroxypropyl methylcellulose (HPMC), sulfonate ester, organosulfate, disulfonate, sulfosuccinic acid ester, organophosphate, or a fluorine-containing surfactant, and the like.

Figure 3A:
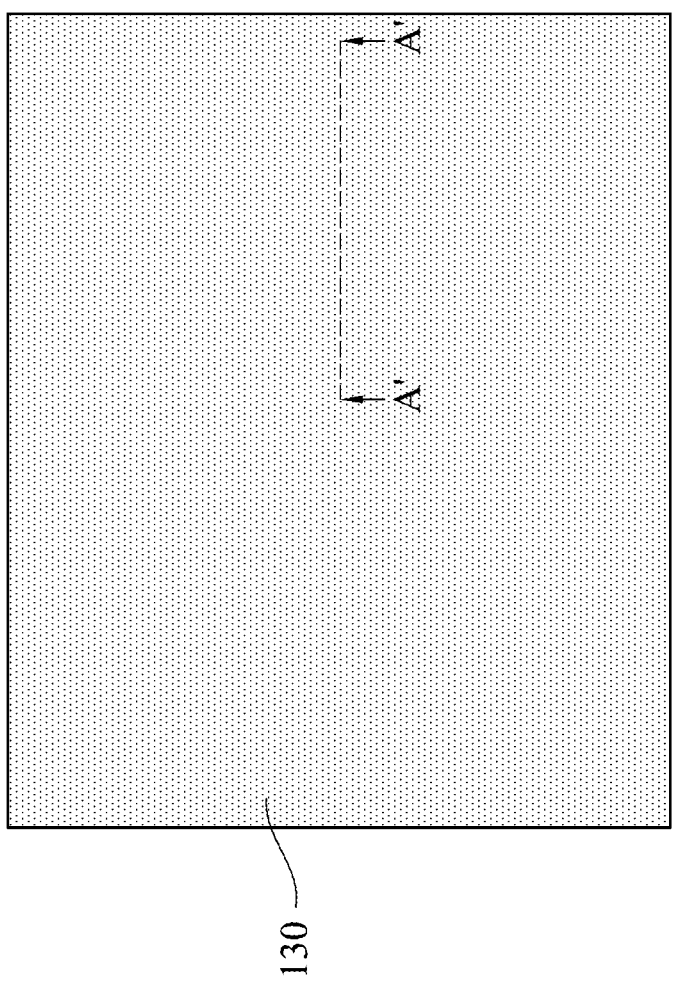
Figure 3B:
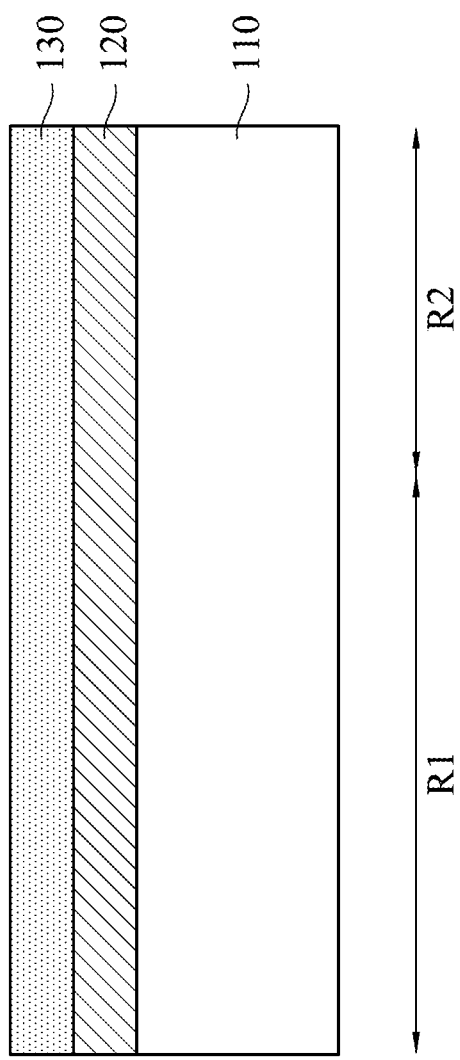
Figure 4A:
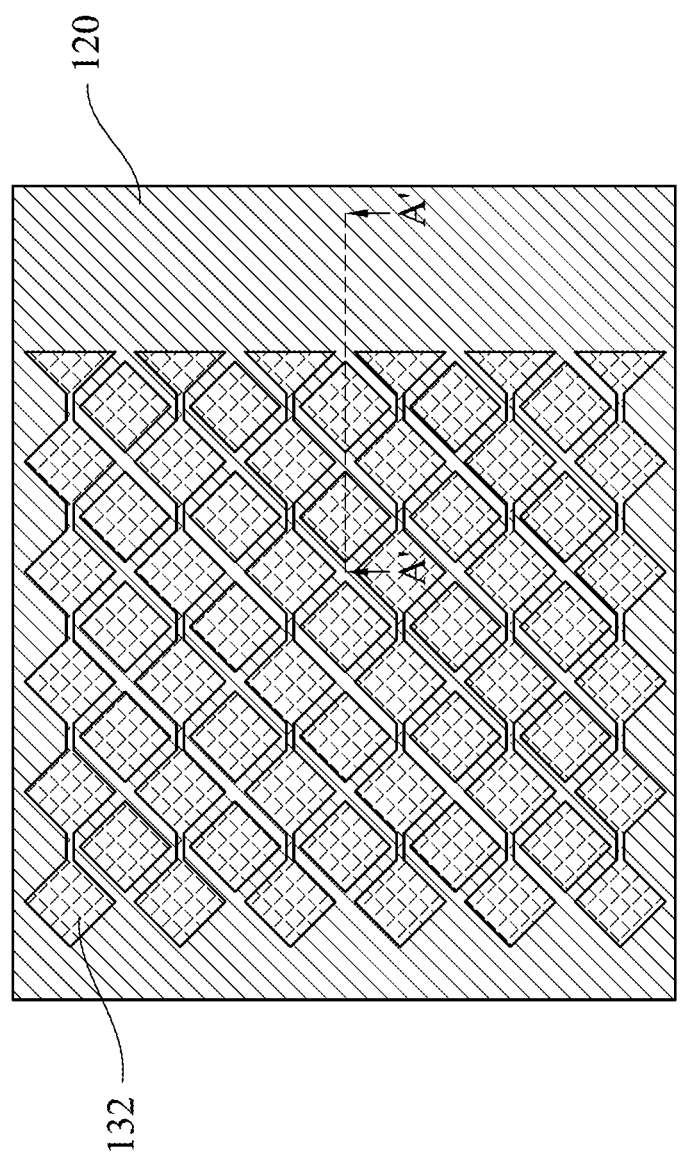
Figure 4B:
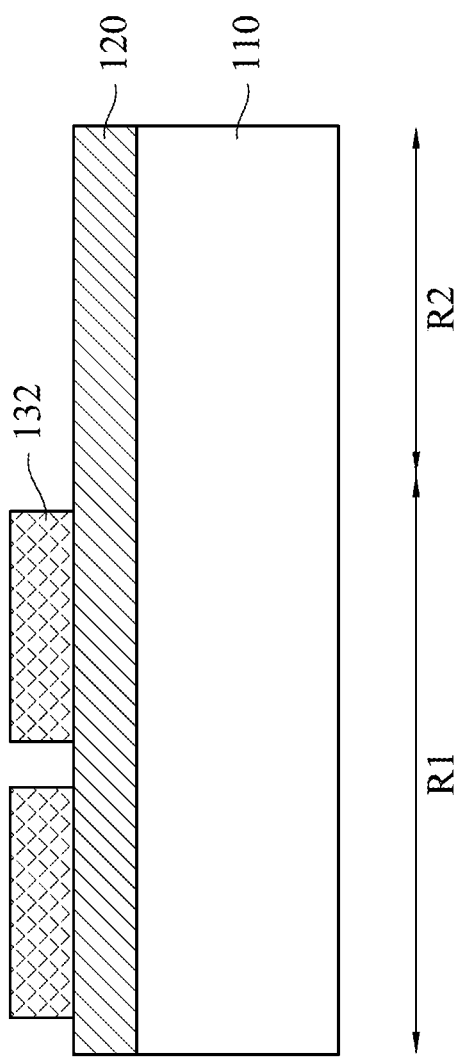
Figure 5A:
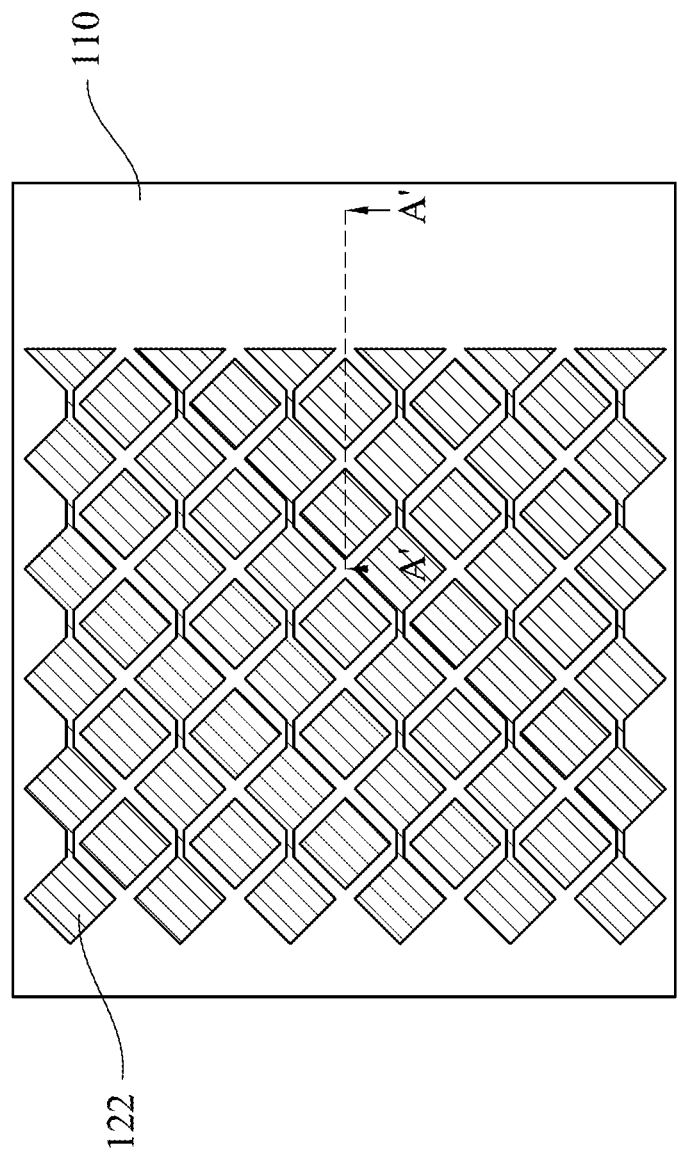
Figure 5B:
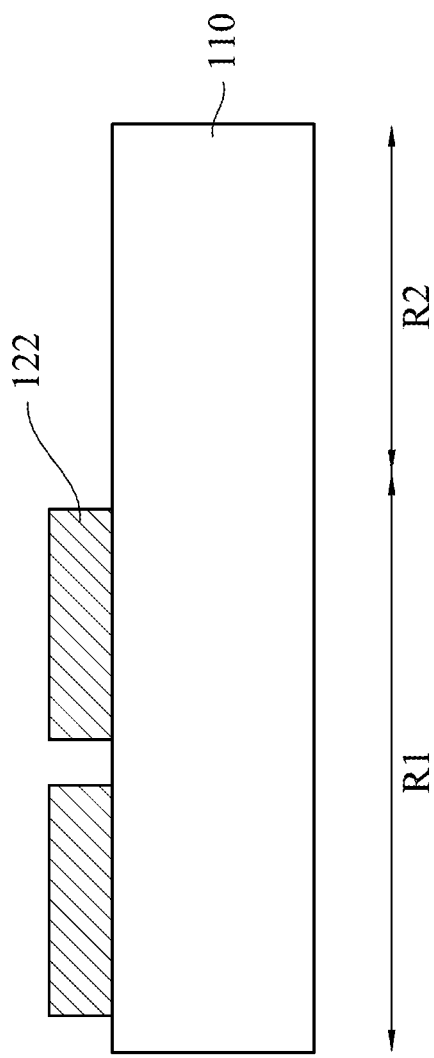

Next, as shown in FIG. 3A and FIG. 3B, a first photoresist layer 130 is formed on the electrode material layer 120. The first region R1 and the second region R2 are entirely covered by the first photoresist layer 130. Next, as shown in FIG. 4A and FIG. 4B, using a mask having a predetermined pattern, the first photoresist layer 130 is exposed and developed to form a first patterned photoresist layer 132. It is noted that in the embodiment shown in FIG. 4A and FIG. 4B, the first patterned photoresist layer 132 is formed only in the first region R1, but the present disclosure is not limited thereto. Thereafter, as shown in FIG. 5A and FIG. 5B, using the first patterned photoresist layer 132 as a mask, the electrode material layer 120 is etched to form the touch electrode layer 122 in the first region R1. The first patterned photoresist layer 132 is then removed. It is noted that in the embodiment shown in FIG. 5A and FIG. 5B, the touch electrode layer 122 is formed only in the first region R1, but the present disclosure is not limited thereto. In one embodiment, the first photoresist layer 130 may be a dry film, and the removal of the first patterned photoresist layer 132 may include stripping off the dry film.

Figure 6A:
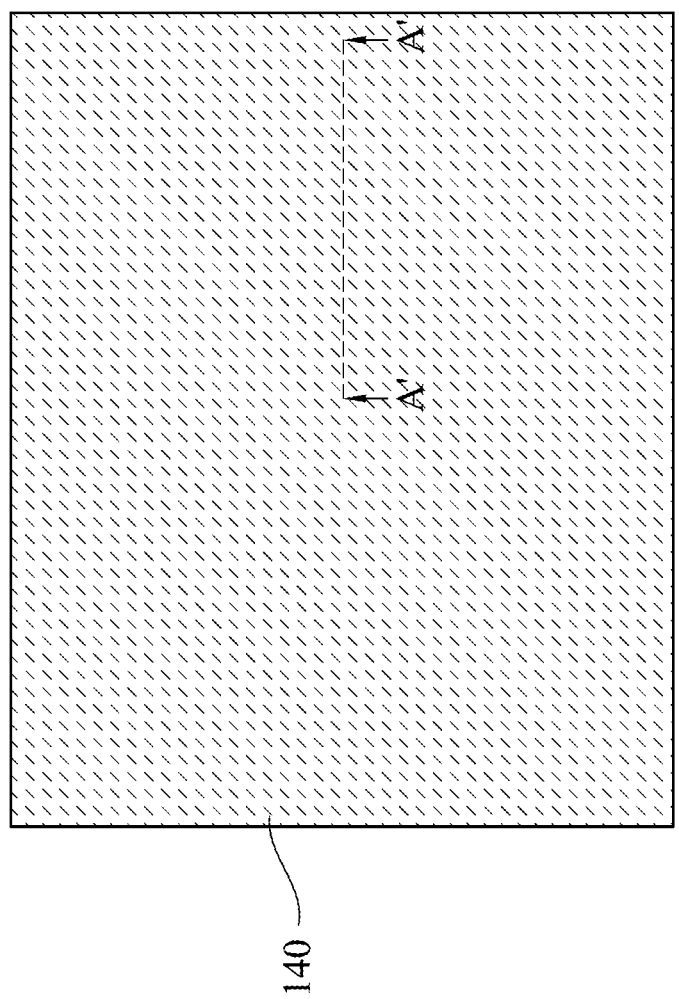
Figure 6B:
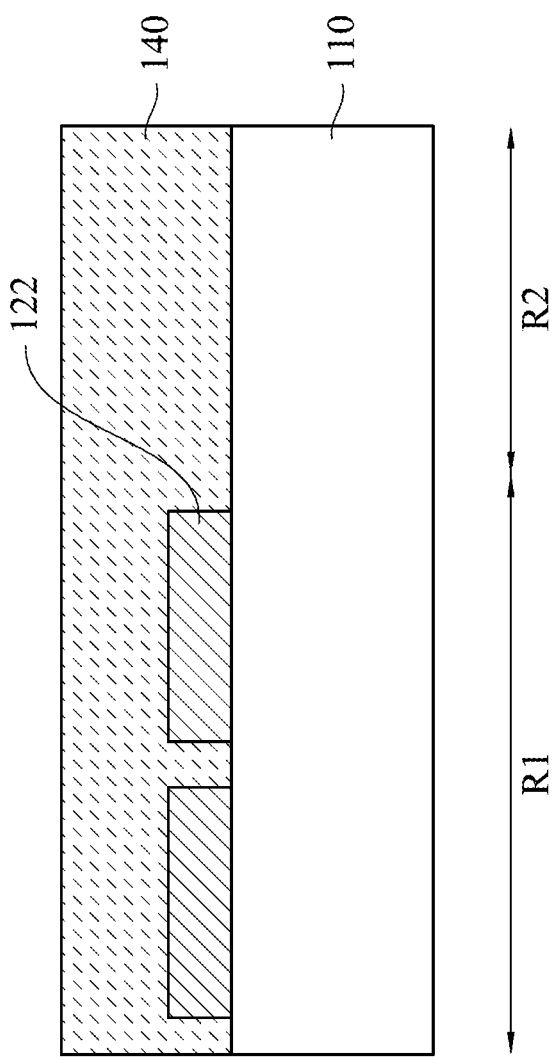
Figure 7A:
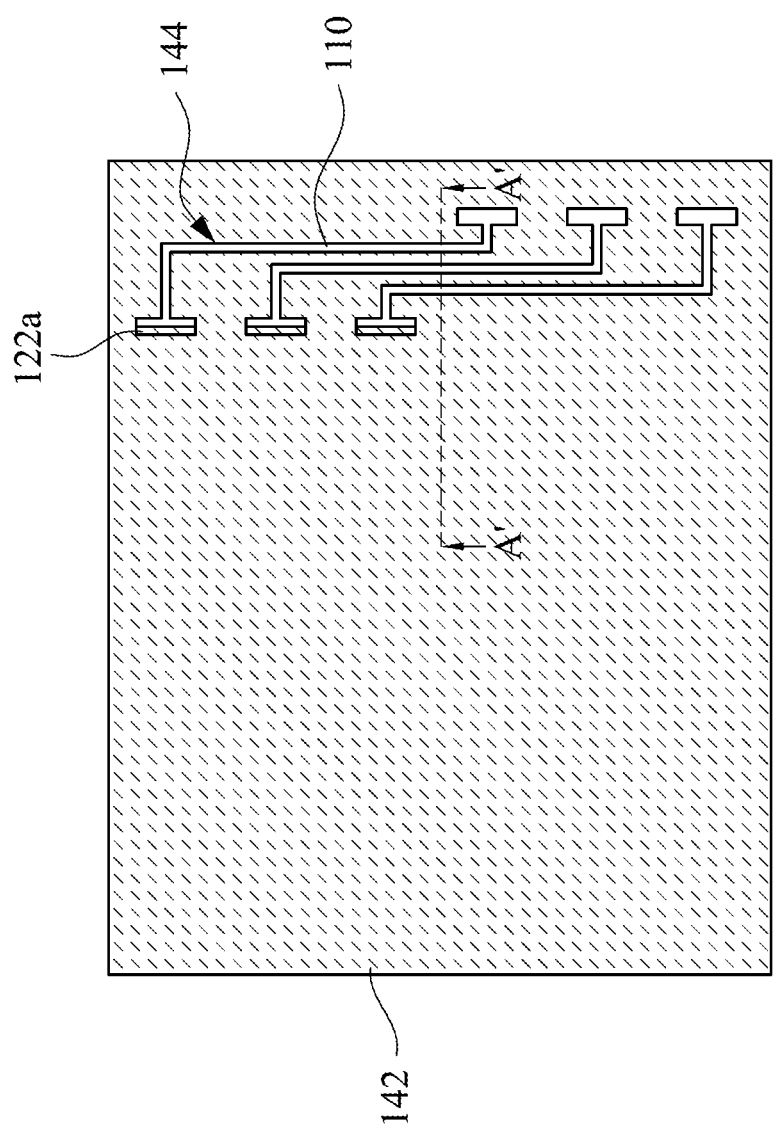
Figure 7B:
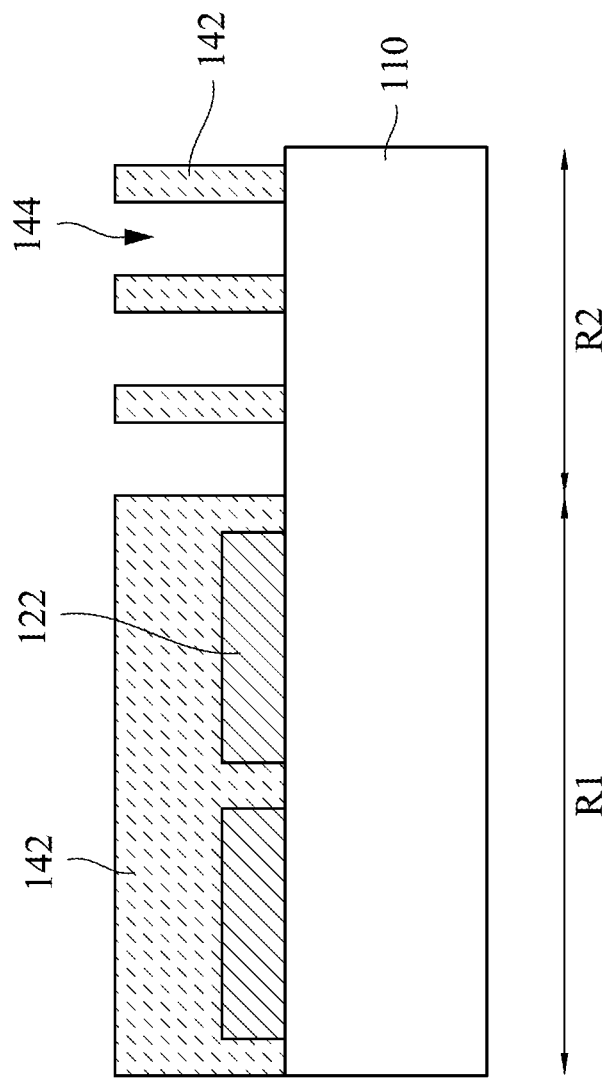

Next, step S130 is performed. Step S130 includes forming a protective layer covering the touch electrode layer and having a plurality of openings in the second region. FIG. 6A and FIG. 7A are top views during various process stages for implementing step S130. FIG. 6B and FIG. 7B are respectively schematic cross-sectional views along line A-A' in FIG. 6A and FIG. 7A.

Reference is made to FIG. 6A and FIG. 6B. In one embodiment, a protective material layer 140 is formed over the substrate 110. It is noted that the touch electrode layer 122 and the substrate 110 are completely covered by the protective material layer 140. In one embodiment, the protective material layer 140 comprises a transparent resin and a photosensitive material. The transparent resin comprises polymethacrylate, polyvinyl alcohol, polyester, aromatic polymer, polyurethane, epoxy resin, polyolefin, cellulose, vinyl chloride, polyacetate, fluorine-containing polymer, and silicon-containing polymer, but is not limited thereto.

Next, as shown in FIG. 7A and FIG. 7B, the protective material layer 140 is patterned to form a protective layer 142 having a plurality of openings 144. In one embodiment, the patterning process includes using an exposure and developing step. The developer may be KOH solution, $Na_2CO_3$ solution, tetramethylamine hydroxide, xylene, and the like. Reference is made to FIG. 7A. It is noted that the protective layer 142 has a plurality of openings 144, and each opening 144 exposes a portion 122a of the touch electrode layer 122 and a portion of the substrate 110. Furthermore, still referring to FIG. 7A, each opening 144 extends from the first region R1 to the second region R2.

Step S140 is performed to form a plurality of lead wires. Each lead wire is formed in corresponding one of the openings and extends from a portion of the touch electrode layer to the second region. Each opening is partially filled with one of the lead wire, such that a recess is defined in each opening. FIG. 8A, FIG. 9A, FIG. 10A, and FIG. 11A are top views during various process stages for implementing step S140. FIG. 8B, FIG. 9B, FIG. 10B, and FIG. 11B are respectively schematic cross-sectional views along line A-A' in FIG. 8A to FIG. 11A.

Figure 8A:
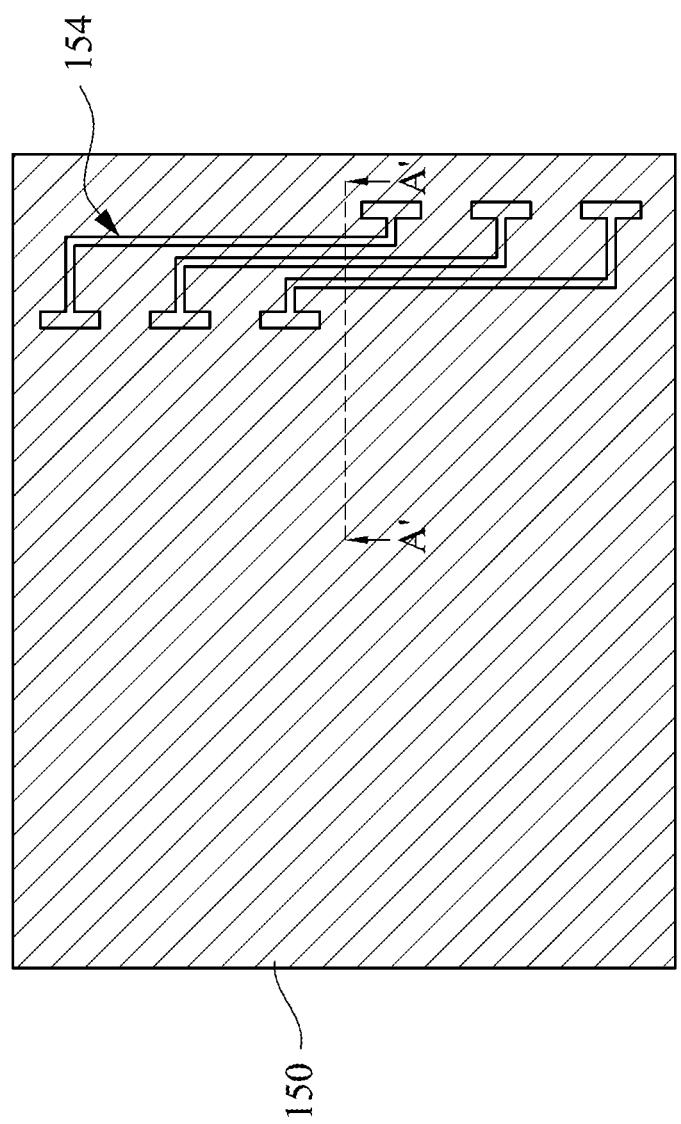
Figure 8B:
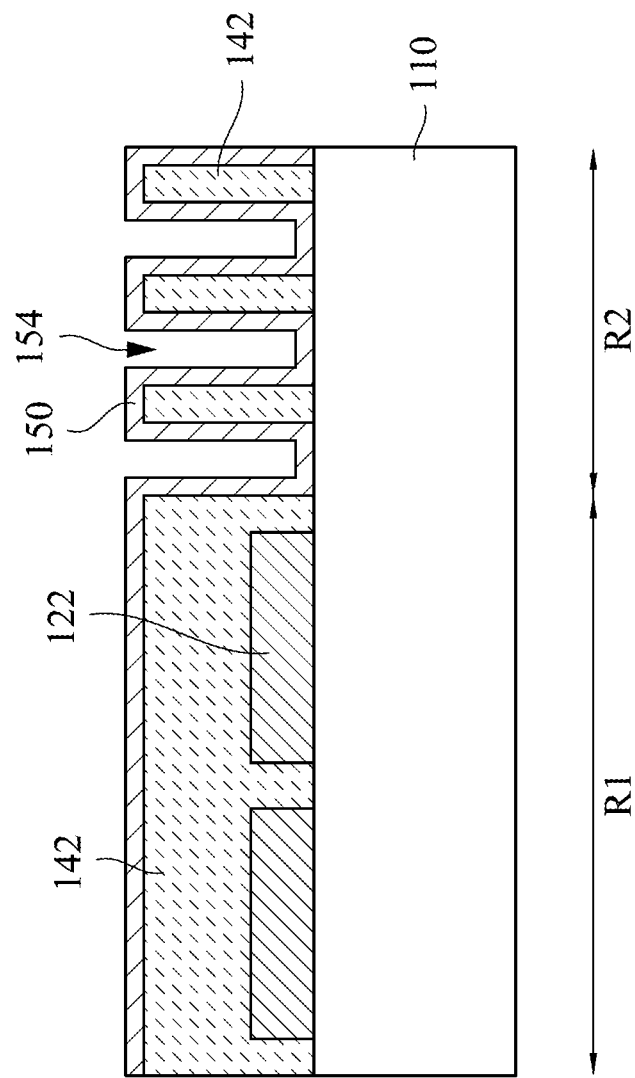

Referring to FIG. 8A and FIG. 8B, a metal layer 150 is conformally formed on the protective layer 142 and inside the openings 144. In other words, the metal layer 150 is conformally located on the bottom and sidewalls of the openings 144, and thereby a recess 154 is defined in each opening 144. It is noted that in the second region R2, the metal layer 150 at the bottom of the openings 144 is in direct contact with the substrate 110. In one embodiment, the metal layer 150 comprises gold, silver, copper, molybdenum, titanium, aluminium, nickel, or a combination thereof. The metal layer 150 is conformally formed by the following process, including but not limited to a sputtering process, an evaporation process, a sol-gel process, a spraying process, a pulsed laser deposition (PLD) process, a chemical vapor deposition (CVD) process, or other suitable processes.

Figure 9A:
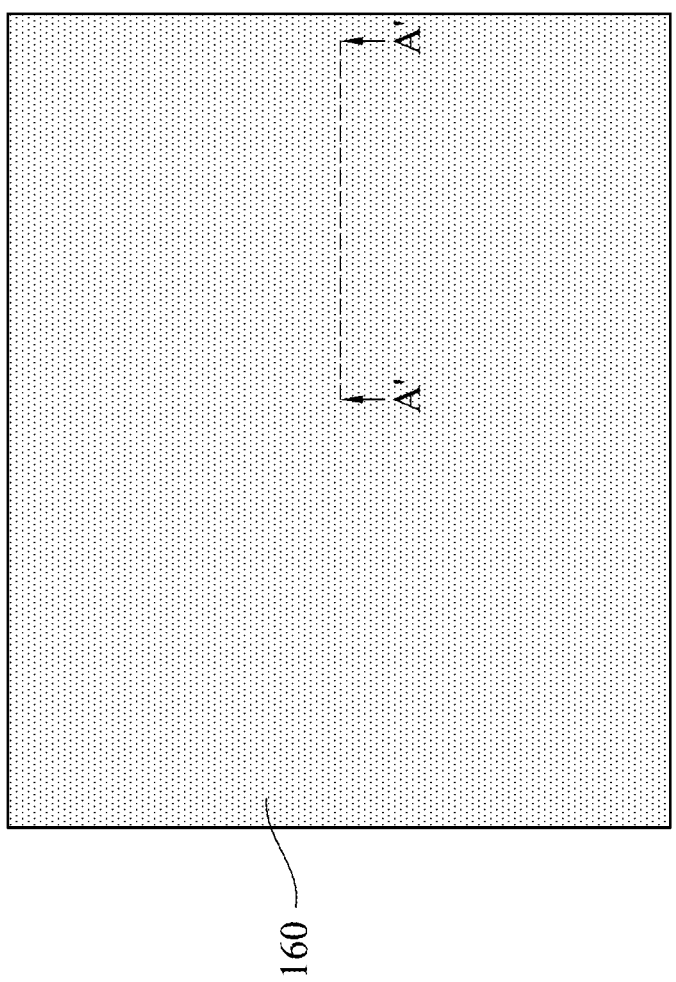
Figure 9B:
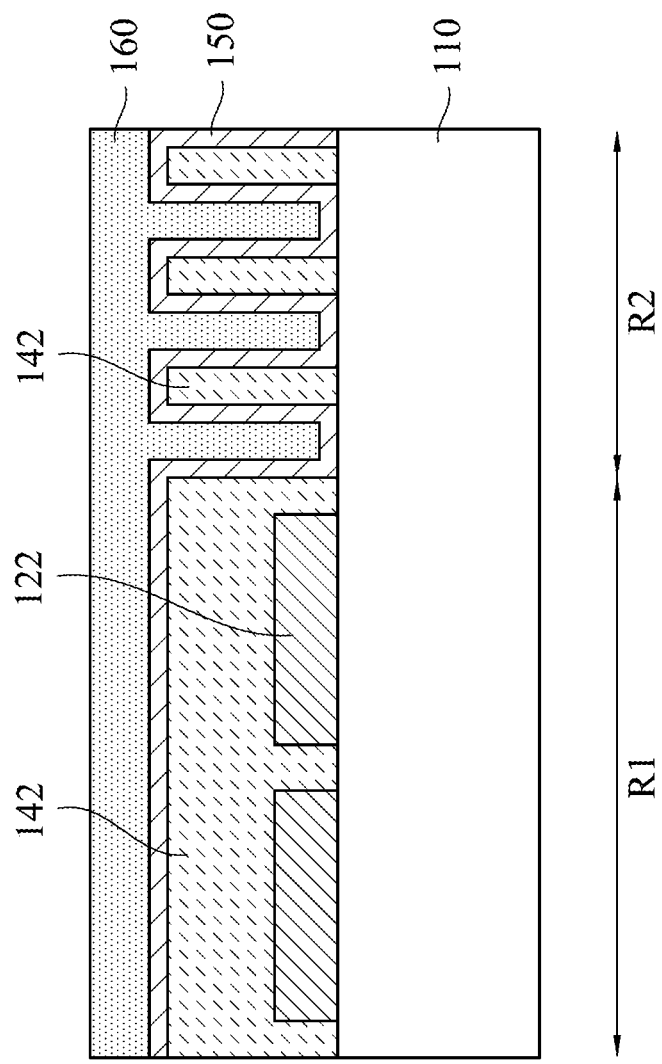

Referring to FIG. 9A and FIG. 9B, a second photoresist layer 160 is formed covering the metal layer 150. The material and forming technique of the second photoresist layer 160 is similar to those of the first photoresist layer 130, and therefore are not repeated herein. It is noted that referring to FIG. 9B, each recess 154 is completely filled with the second photoresist layer 160.

Figure 10A:
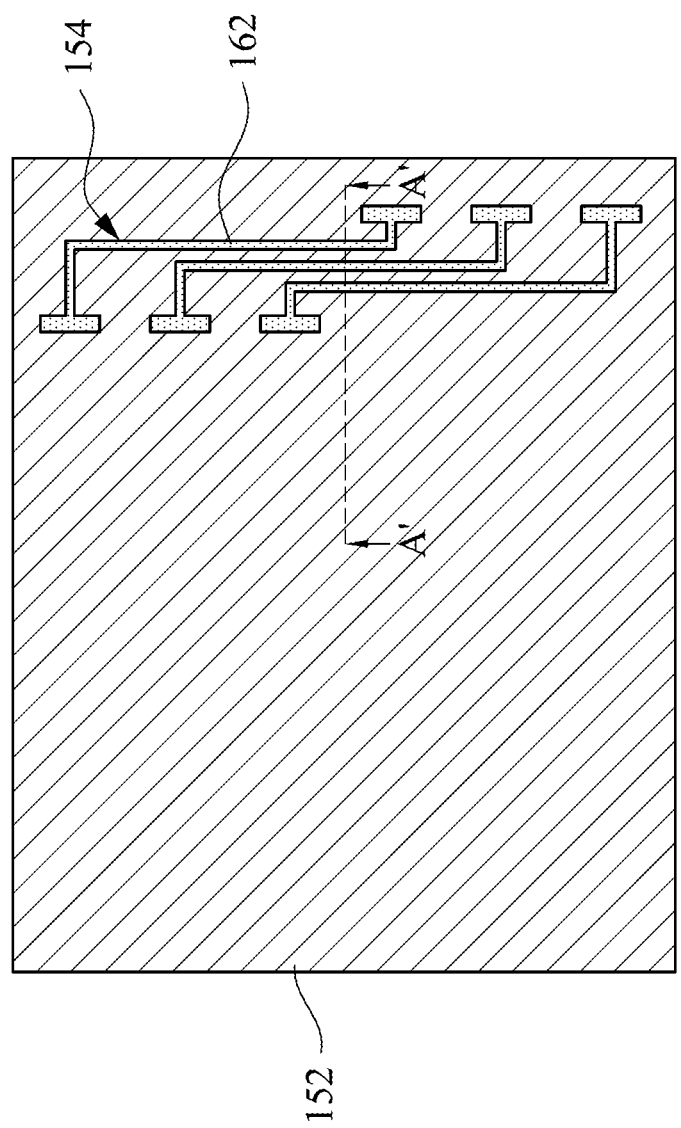
Figure 10B:
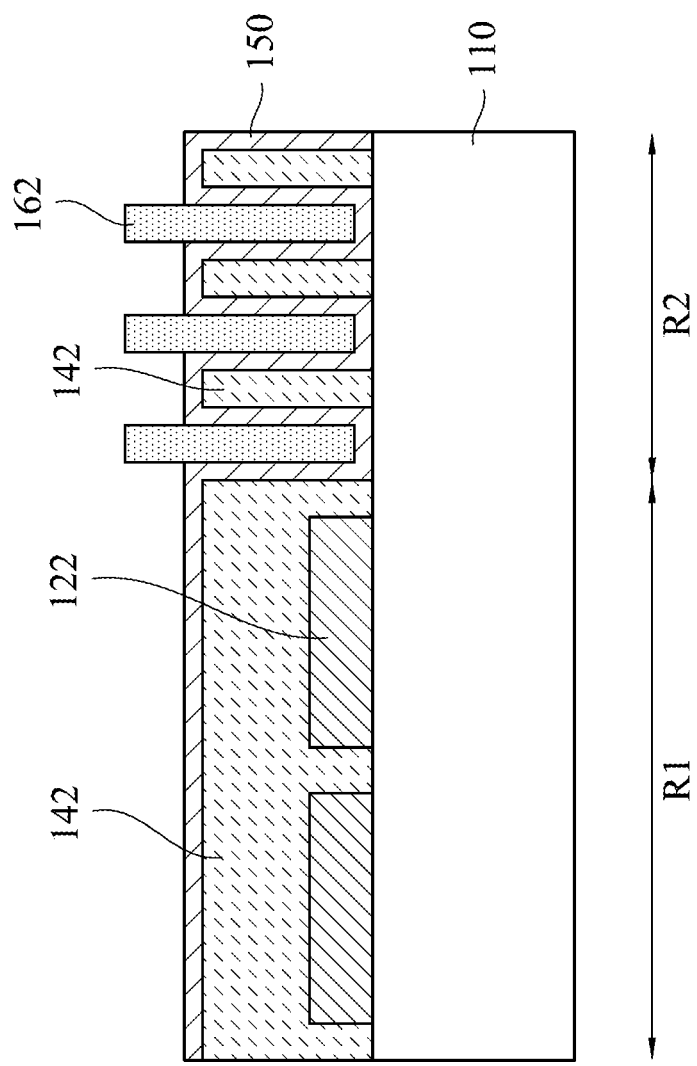

Next, referring to FIG. 10A and FIG. 10B, the second photoresist layer 160 is exposed and developed using a second predetermined mask pattern to form a second patterned photoresist layer 162, and a portion of the metal layer 150 is exposed. The forming technique of the second patterned photoresist layer 162 is similar to that of the first patterned photoresist layer 132, and therefore is not repeated herein. It is noted that with reference to FIG. 10B, the second patterned photoresist layer 162 remains in each recess 154.

Figure 11A:
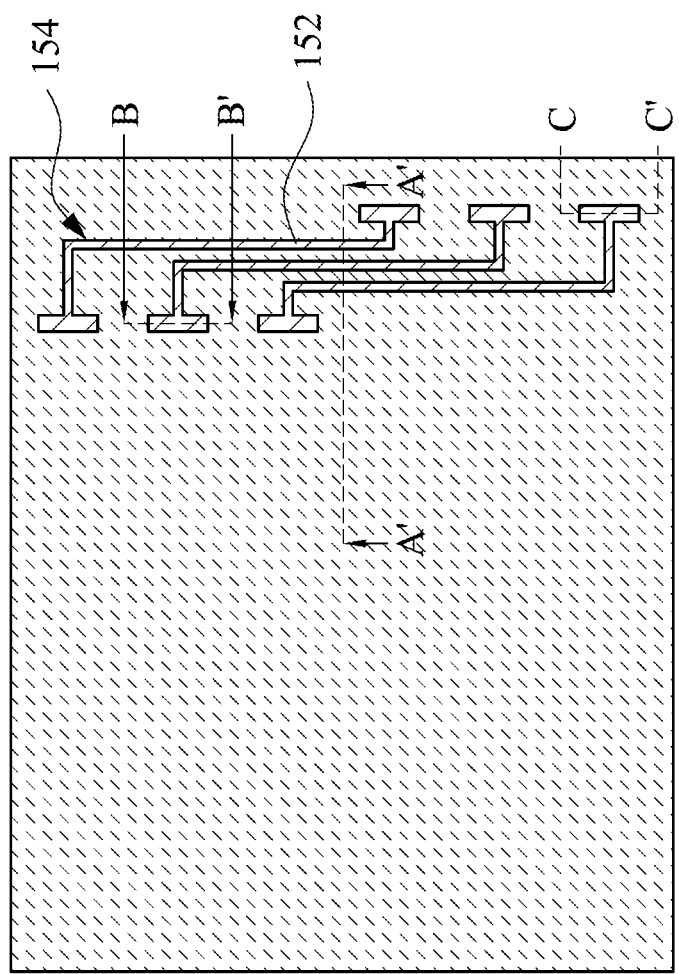
Figure 11B:
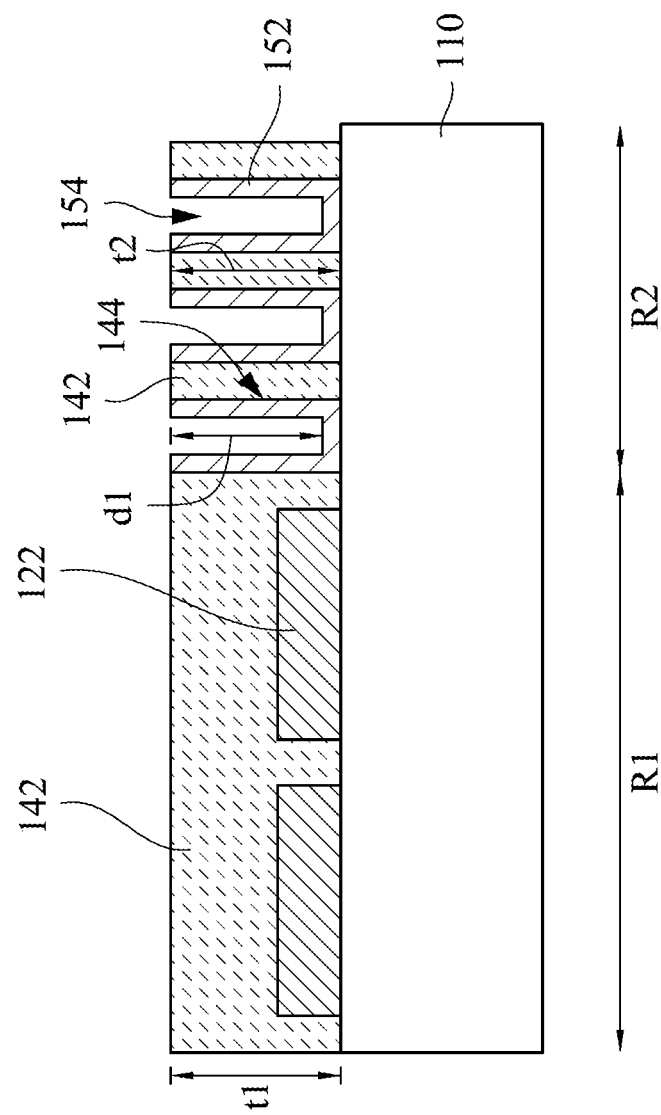

Next, referring to FIG. 11A and FIG. 11B, the metal layer 150 is etched to form a plurality of lead wires 152, and then the second patterned photoresist layer 162 is removed. In one embodiment, by selecting an appropriate etchant and controlling the etching time, portions of the metal layer 150 on the horizontal direction are removed, thereby forming the lead wires 152 shown in FIG. 11A and FIG. 11B. As shown in FIG. 11A, the portion 122a of the touch electrode layer 122 is covered by each lead wire 152, and each lead wire 152 extends from the portion 122a of the touch electrode layer 122 to the second region R2. Referring to FIG. 11B, each lead wire 152 is formed in corresponding one of the openings 144. Each opening 144 is partially filled with one of the lead wire 152, and thereby the recess 154 is defined in each opening 144.

Another aspect of the present disclosure is to provide a touch device. The touch device can avoid short circuit problem of traces. Reference is made to FIG. 11A and FIG. 11B. In one embodiment, a touch device 200 comprises a substrate 110, a touch electrode layer 122, a protective layer 142, and a plurality of lead wires 152. The material of the substrate 110, the touch electrode layer 122, the protective layer 142, and the lead wires 152 have been described above, and therefore are not repeated herein.

As shown in FIG. 11B, the substrate 110 includes a first region R1 and a second region R2. The second region R2 is adjacent to the first region R1. The touch electrode layer 122 is disposed in the first region R1. The touch electrode layer 122 in the first region R1 is covered by the protective layer 142. In one embodiment, the protective layer 142 in the first region R1 has a first thickness t1 ranged from 1 μm to 15 μm. In one embodiment, the protective layer 142 in the second region R2 has a second thickness t2 ranged from 1 μm to 15 μm. In one embodiment, the second thickness t2 is equal to the first thickness t1. The protective layer 142 has a plurality of openings 144. It is noted that as shown in FIG. 11A and FIG. 11B, the openings 144 extend from the first region R1 to the second region R2.

As shown in FIG. 11B, each lead wire 152 is formed in corresponding one of the openings 144. In one embodiment, each lead wire 152 is conformally formed in the openings 144. Specifically, each opening 144 is partially filled with one of the lead wire 152, and thereby the recess 154 is defined in each opening 144. In one embodiment, the recess 154 has a depth ranged from 1 μm to 15 μm. It is noted that the depth d1 of each recess 154 is less than the first thickness t1 and the second thickness t2 of the protective layer 142. In other words, the depth d1 of the recess 154 depends on the difference between the first thickness t1 or the second thickness t2 of the protective layer 142 and the thickness of each lead wire 152. In one embodiment, in the second region R2, the metal layer 150 in the openings 144 is in direct contact with the substrate 110.

It is noted that as shown in FIG. 11A and FIG. 11B, the portion 122a of the touch electrode layer 122 is covered by the lead wires 152, and each lead wire 152 extends from the portion 122a of the touch electrode layer 122 to the second region R2.

Figure 11C:
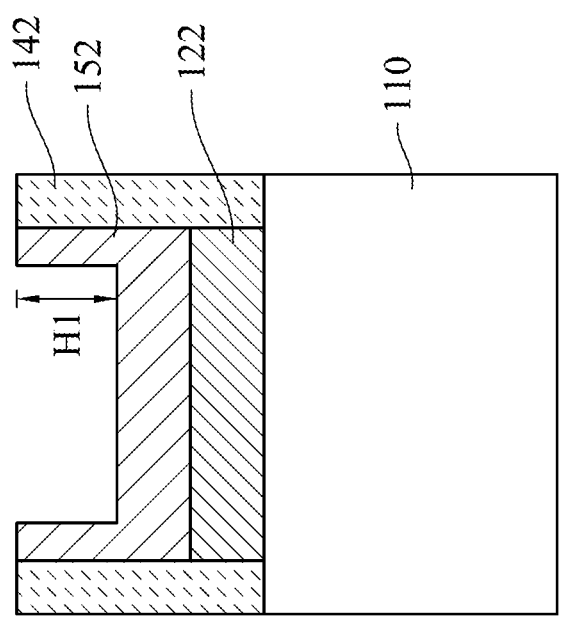
FIG. 11C illustrates a schematic sectional view along line B-B' in FIG. 11A according to one embodiment of the present disclosure.

FIG. 11C illustrates a schematic sectional view along line B-B' in FIG. 11A according to one embodiment of the present disclosure. It is noted that in FIG. 11C, the touch electrode layer 122 and the lead wire 152 are located between the adjacent protective layer 142, and the lead wire 152 is disposed on the touch electrode layer 122. In other words, the touch electrode layer 122 is located between the substrate 110 and the lead wire 152. In one embodiment, a first height difference H1 between the protective layer 142 and the lead wire 152 ranges from 1 μm to 15 μm.

Figure 11D:
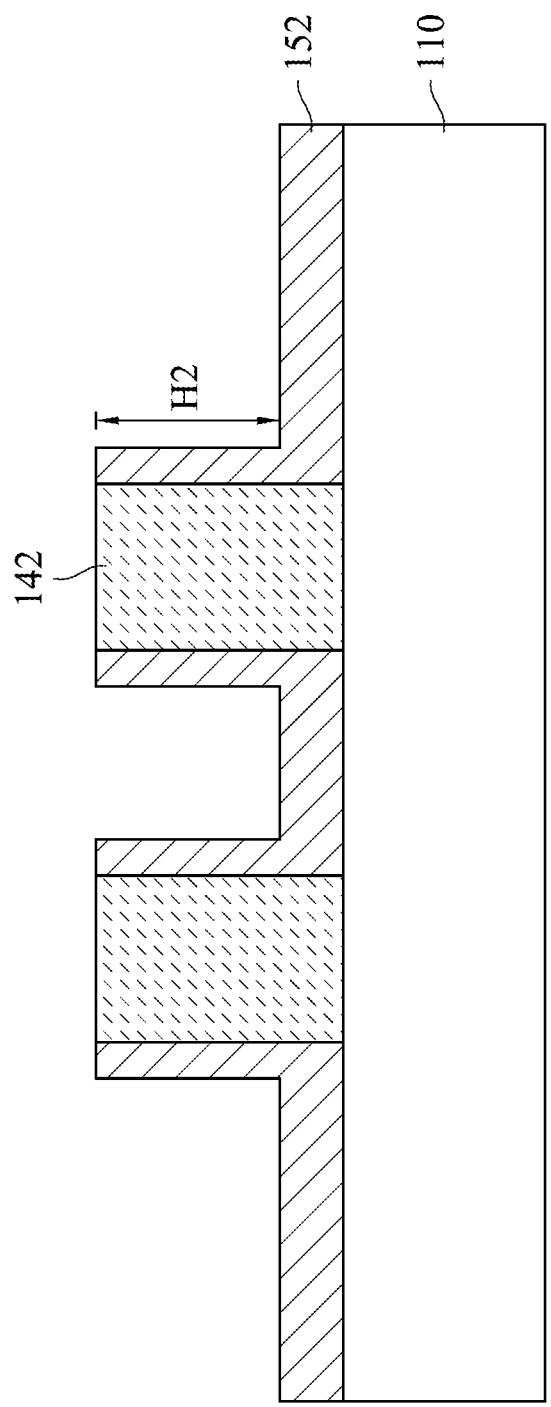
FIG. 11D illustrates a schematic sectional view along line C-C' in FIG. 11A according to one embodiment of the present disclosure.

FIG. 11D illustrates a schematic sectional view along line C-C' in FIG. 11A according to one embodiment of the present disclosure. It is noted that in the embodiment shown in FIG. 11D, the lead wire 152 is in direct contact with the substrate 110. In one embodiment, a second height difference H2 between the protective layer 142 and the lead wire 152 ranges from 1 μm to 15 μm.

Figure 11E:
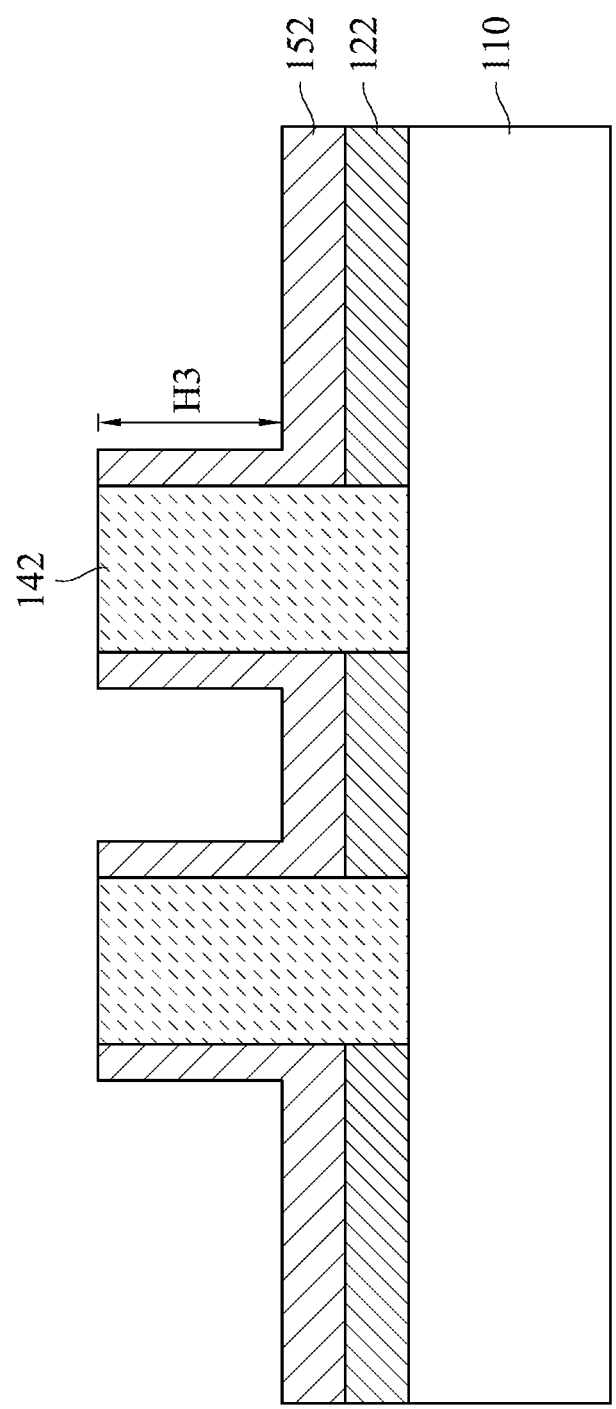
FIG. 11E illustrates a schematic sectional view along line C-C' in FIG. 11A according to another embodiment of the present disclosure.

FIG. 11E illustrates a schematic sectional view along line C-C' in FIG. 11A according to another embodiment of the present disclosure. It is noted that in the embodiment shown in FIG. 11E, the lead wire 152 is disposed on the touch electrode layer 122. In other words, the touch electrode layer 122 is located between the substrate 110 and the lead wire 152. In one embodiment, a third height difference H3 between the protective layer 142 and the lead wire 152 ranges from 1 μm to 15 μm.

In summary, the present disclosure provides a touch device which is capable of avoiding short circuit and a manufacturing method thereof. When copper is etched during the process, the silver nanowire in the touch device is not susceptible to the copper etching liquid, thereby avoiding the formation of copper-silver crystals, and thus avoiding the problem of short circuit. In addition, the present disclosure is applicable to various designs of touch device, such as single-layer multi-point, double-sided bonding (FF), single-sided or double-sided touch devices.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch device, comprising:
   a substrate comprising a first region and a second region, wherein the second region is adjacent to the first region;
   a touch electrode layer disposed in the first region;
   a protective layer covering the touch electrode layer in the first region, wherein the protective layer has a plurality of openings exposing a portion of the touch electrode layer in the first region, and the openings extend from the first region to the second region; and
   a plurality of lead wires, wherein the lead wires are positioned in the openings and in direct contact with an upper surface of the portion of the touch electrode layer, each of the lead wires is conformal with a corresponding one of the openings and extending from the upper surface of the portion of the touch electrode layer to the second region, each of the openings is partially filled with one of the lead wires, a recess is defined in each of the openings, and the recess is above the portion of the touch electrode layer in the first region.

2. The touch device of claim 1, wherein a thickness of the protective layer ranges from 1 μm to 15 μm.

3. The touch device of claim 2, wherein a depth of each of the recesses ranges from 1 μm to 15 μm, and the depth of each of the recesses is less than the thickness of the protective layer.

4. The touch device of claim 1, wherein the depth of each of the recesses is less than the thickness of the protective layer.

5. A method of manufacturing touch device, comprising steps of:
   providing a substrate comprising a first region and a second region adjacent to the first region;
   forming a touch electrode layer in the first region;
   forming a protective layer covering the touch electrode layer, wherein the protective layer has a plurality of openings exposing a portion of the touch electrode layer in the first region, and the openings extend from the first region to the second region; and
   forming a plurality of lead wires positioned in the openings and in direct contact with an upper surface of the portion of the touch electrode layer, wherein each of the lead wires is conformal with a corresponding one of the openings, and extend from the upper surface of the portion of the touch electrode layer to the second region, each of the openings is partially filled with one of the lead wire, a recess is defined in each of the openings, and the recess is above the portion of the touch electrode layer in the first region.

6. The touch device of claim 5, wherein forming the plurality of lead wires positioned in the openings and in direct contact with the upper surface of the portion of the touch electrode layer comprises:
   forming a metal layer on the protective layer and on sidewalls of the openings, wherein the openings are partially filled with the metal layer;
   forming a photoresist layer to cover the metal layer and to fill the openings;
   patterning the photoresist layer to leave a patterned photoresist layer in the openings and expose a portion of the metal layer; and
   etching the portion of the metal layer to form the lead wires.

7. A touch device, comprising:
   a substrate comprising a first region and a second region, wherein the second region is adjacent to the first region;
   a touch electrode layer disposed in the first region;
   a protective layer covering the touch electrode layer in the first region, wherein the protective layer is thicker than the touch electrode layer and has a plurality of openings exposing a portion of the touch electrode layer in the first region, and the openings extend from the first region to the second region; and
   a plurality of lead wires positioned in the openings, wherein one of the lead wires covers a sidewall of a corresponding one of the openings and an upper surface of the portion of the touch electrode layer, and extends from the upper surface of the portion of the touch electrode layer to the second region, the one of the lead wires surrounds a recess in the corresponding one of the openings, the recess is above the portion of the touch electrode layer in the first region, and the lead wires in the openings is in direct contact with the substrate in the second region.

* * * * *